(12) United States Patent
Mueller et al.

(10) Patent No.: US 7,214,155 B2
(45) Date of Patent: May 8, 2007

(54) ELECTRIC DRIVE UNIT FOR MOTOR VEHICLES

(75) Inventors: Anton Mueller, Tutzing (DE); Fritz Walter, Raisting (DE); Peter Ehrhart, Munich (DE); Jens Steffen, Raisting (DE)

(73) Assignee: Magnet-Motor Gesellschaft fuer magnetmotorische Technik mbH, Starnberg (DE)

( * ) Notice: Subject to any disclaimer, the term of this patent is extended or adjusted under 35 U.S.C. 154(b) by 115 days.

(21) Appl. No.: 11/044,735

(22) Filed: Jan. 28, 2005

(65) Prior Publication Data

US 2005/0245341 A1 Nov. 3, 2005

(30) Foreign Application Priority Data

Jan. 29, 2004 (DE) .................. 10 2004 004 617

(51) Int. Cl.
- *F16H 3/72* (2006.01)
- *F16H 57/08* (2006.01)
- *B60K 1/00* (2006.01)

(52) U.S. Cl. ................... 475/5; 475/338; 180/65.5

(58) Field of Classification Search .......... 475/5, 475/338, 317; 180/372, 65.5; 290/65.6
See application file for complete search history.

(56) References Cited

U.S. PATENT DOCUMENTS

| | | | | |
|---|---|---|---|---|
| 3,370,668 A | * | 2/1968 | Goodacre | 180/253 |
| 3,477,547 A | * | 11/1969 | Kress et al. | 184/63 |
| 3,770,074 A | * | 11/1973 | Sherman | 180/65.6 |
| 3,943,780 A | * | 3/1976 | Klaue | 475/317 |
| 4,346,777 A | * | 8/1982 | Restelli | 180/220 |
| 5,014,800 A | * | 5/1991 | Kawamoto et al. | 180/65.5 |
| 5,156,579 A | * | 10/1992 | Wakuta et al. | 475/161 |
| 5,237,230 A | * | 8/1993 | Sugiyama et al. | 310/113 |
| 5,382,854 A | * | 1/1995 | Kawamoto et al. | 180/65.6 |

(Continued)

FOREIGN PATENT DOCUMENTS

DE 42 14 716 A1 11/1992

(Continued)

OTHER PUBLICATIONS

European Search Report from EP 05 00 1679, dated Sep. 4, 2006 (plus translation).

(Continued)

*Primary Examiner*—Roger Pang
(74) *Attorney, Agent, or Firm*—Venable LLP; Robert Kinberg; Steven J. Schwarz

(57) ABSTRACT

An electric drive unit for a motor vehicle comprises an electric motor having a motor housing, a stator mounted in the motor housing and having coil-wound poles, a rotor arranged internally of the stator with an air gap present between the stator and the rotor, and a planetary gear system having a sun wheel, a planet carrier, planet wheels and a ring gear. The planet wheels have a maximum diameter and axial positioning that an imaginary common envelope cylinder for all maximum diameters of the planet wheels is located radially inside of the winding heads present on one axial side of the stator and axially beside the portion of the rotor adjoining the air gap and that the planet wheels project in axial direction outwardly beyond said winding heads either not at all or with less than 50% of their tooth width in engagement with the sun wheel.

25 Claims, 2 Drawing Sheets

Figure 1:
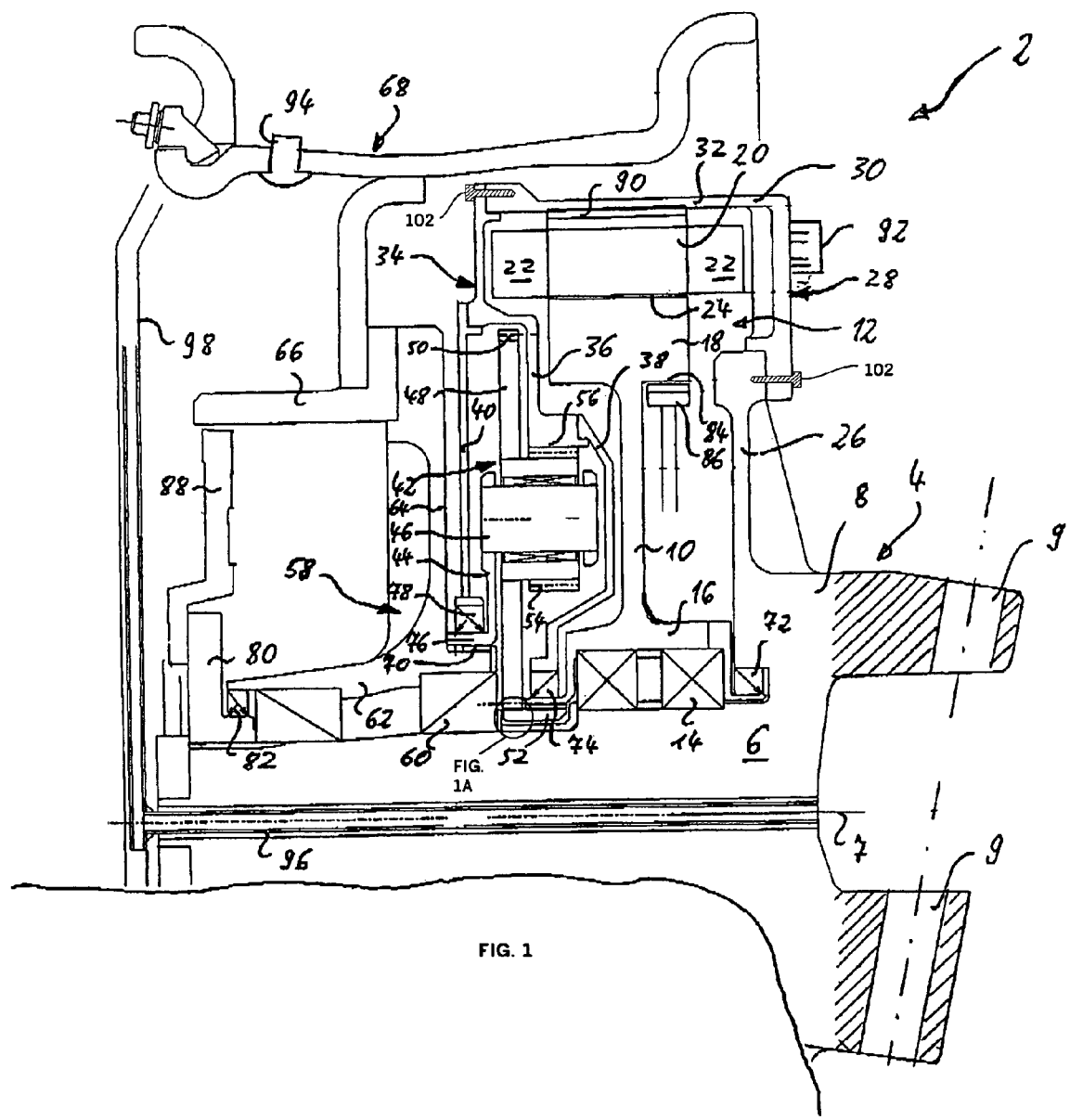

U.S. PATENT DOCUMENTS 5,600,191 A * 2/1997 Yang .................... 310/67 R
7,001,297 B2 * 2/2006 Shimizu et al. ............ 475/5

FOREIGN PATENT DOCUMENTS

| DE | 44 04 926 A1 | 8/1995 |
| DE | 198 05 679 A1 | 8/1999 |
| DE | 101 56 269 A1 | 6/2003 |
| EP | 0 463 895 A1 | 1/1992 |
| EP | 1 158 652 A2 | 11/2001 |

OTHER PUBLICATIONS

German Office Action from DE 10 2004 004 617.4-32, dated Sep. 28, 2004 (plus translation).

* cited by examiner

ELECTRIC DRIVE UNIT FOR MOTOR VEHICLES

CROSS-REFERENCE TO RELATED APPLICATION

This application claims the priority of German Patent Application No. 10 2004 004 617.4 filed Jan. 29, 2004, the subject matter of which is incorporated herein by reference.

Subject matter of the invention is an electric drive unit for a motor vehicle, comprising;
- (a) an electric motor having a motor housing fixed in non-rotatable manner;
- (b) a stator of said electric motor, with the stator being mounted in the motor housing and having coil-wound poles;
- (c) a rotor of the electric motor arranged internally of the stator, with an air gap being present between the pole faces of the stator and the outer periphery of the rotor facing said pole faces of the stator;
- (d) a planetary gear system having a sun wheel, a planet carrier, planet wheels and a ring gear,
- (e) the rotor of the electric motor and the sun wheel of the planetary gear system being coupled for torque transmission;
- (f) a gear casing of the planetary gear system, the gear casing being attached to the motor housing or—at least in part—being an integral component part of the motor housing;
- (g) as well as the feature that the planet wheels have such a maximum diameter and such axial positioning that an imaginary common envelope cylinder for all maximum diameters of the planet wheels is located radially inside of the winding heads present on one axial side of the stator as well as axially beside the portion of the rotor adjoining the air gap and that the planet wheels project in axial direction outwardly beyond said winding heads either not at all or with less than 50% of their tooth width in engagement with the sun wheel.

There are already known electric drive units for motor vehicles in which an electric motor and a planetary gear system are united. Such drive units so far have been designed with electric motors composed with an external rotor, which, according to the principles involved, promises advantages in the interest of high torque output of the electric motor.

The drive unit according to the invention takes a different approach. The construction with electric motor having an internal rotor indeed leads to a lower output torque of the electric motor by way of the principles involved, but the integration of the planetary gear system in the drive unit as indicated in the initial paragraph provides for the possibility of a accommodating in extremely space-saving manner a high stepping down arrangement, so that it is thus possible to achieve a desirably high output torque of the drive unit. The internal rotor can be coupled to the sun wheel of the planetary gear system in an uncomplicated path of torque flow. The afore-mentioned integration of the planetary gear system in the electric motor or the electric drive leads to an extraordinarily compact drive unit. Sealing of the motor inside towards the outside is extremely simple; a waterproof design of the electric motor can be achieved without any problem. The concept of the drive unit according to the invention has the effect that the wheel drive unit is of very uncomplicated structure mechanically and in terms of the interleaved arrangement of the components and that the bearings are provided at advantageous locations; this is of advantage for a weight-saving construction. In addition thereto, it is very easily possible to achieve gear cooling by thermal conduction to the motor housing of the electric motor. In total, there is achieved a construction that is extremely expedient under the aspects of simple manufacture, simply assembly, maintenance friendliness, the high power density, the high torque density, operational safety, the weight reduction achievable, the cooling of the planetary gear system and the good sealing effect towards the outside. Advantages of this type will become still more evident further below in the description of an embodiment.

The motor vehicle preferably is a non-railbound motor vehicle, e.g. a motor vehicle moving directly on land ground. The land ground may be a paved road or other paved surface (e.g. the apron of an airport). However, it will become still clearer from the further description that the motor vehicle preferably is one of the type that is capable of moving well on unpaved underground, in particular agricultural terrain, wood terrain, free land, expedition roads, stony terrain, sand terrain and many more. To be indicated as concrete examples of such motor vehicles are all-terrain passenger vehicles, vehicles for expeditions to pathless terrain, trucks, construction vehicles employed for earthwork. The motor vehicle may be a motor vehicle having only one driven axle or a motor vehicle having two driven axles spaced apart in the longitudinal direction of the motor vehicle or also a motor vehicle having still more driven axles. However, particularly emphasized is the possibility of an all-wheel drive motor vehicle in which each wheel has an electric drive unit.

The electric drive unit of course needs current to drive the motor vehicle. There is a number of possibilities for providing current: from an overhead line with current consumers (as known from trolley busses), a current generating unit (driven by a combustion engine in the widest sense, in particular a diesel engine, Otto engine, gas turbine) on board of the motor vehicle, a current accumulator on board of the motor vehicle, a fuel cell. Combinations of these "current sources" are possible, in particular a current generating unit plus a current accumulator for covering peak loads and/or for brief, exhaust-free riding.

The rotor of the electric motor preferably is a non-coil-wound rotor so that it is not necessary to have a current-conducting connection between the rotor and the non-rotating parts of the drive unit.

It is pointed out in the initial paragraph hereof "that the planet wheels project in axial direction externally beyond said winding heads either not at all or with less than 50% of their tooth width in engagement with the sun wheel". It is preferred for this projecting beyond to be less than 30% of said tooth width, still more preferably less than 10% of said tooth width.

In the drive unit according to the invention, the planetary gear system preferably is designed such that the ring gear is non-rotatable and the rotatable planet carrier is provided for transmission output. The embodiment of the invention will demonstrate that, in case of the invention, the ring gear can be integrated to the transmission or gear casing in very simple and expedient manner. The planet wheels preferably are stepped planet wheels, which permit a high speed reduction ratio to be obtained in the planetary gear system. The stepped planet wheels preferably have their small outer diameter project into a space of the rotor which is axially recessed from the face side of the rotor present at the portion of the rotor adjoining the air gap. This provides for an immensely space-saving accommodation of the planetary gear system.

It is possible to accommodate in the drive unit a transmission or gear system having more than one stage, i.e. in addition to the planetary gear stage described so far, for example a spur gear stage or also an additional planetary gear stage. However, for reasons of space it is preferred that the speed of the electric motor is stepped down with the planetary gear stage described only.

The drive unit preferably is composed such that there is provided a central stub axle on which the motor housing is mounted and/or with which the motor housing—at least in part—forms an integral component; and that the rotor is supported on the stub axle. The stub axle component at the same time may be the component through which the entire drive unit is mounted on the motor vehicle.

Preferably, the sun wheel is an externally toothed hollow wheel having the stub axle extending therethrough. Planetary gear systems that are desired to provide a high speed changing ratio usually should have a sun wheel with as small diameter as possible. In the development of the invention just mentioned, there is necessarily arising a sun wheel with no particularly small diameter since the normally strong stub axle is passed therethrough. However, a sun wheel having a comparatively larger diameter provides for the advantage of reduced wear. The feature (g) described in the initial paragraph has the effect that planet wheels of comparatively large outer diameter may be provided. Together with the preferred provision of stepped planet wheels, there is obtained a planetary gear system of high gear changing ratio—despite the sun wheel of comparatively large diameter. The speed reduction ratio preferably is more than 5:1, still more preferably more than 7:1, still more preferably more than 8:1 and still more preferably more than 9:1.

The stub axle, in a position axially beside the electric motor and the planetary gear system, preferably has a wheel carrier rotatably mounted thereon. In this manner, there is formed a wheel drive unit which in total is extremely compact and of mechanically advantageous construction. The wheel carrier preferably is a wheel carrier of the type on which a tire rim, in particular a standard rim, may be mounted. However, it is emphasized that the term "wheel carrier" does not necessarily mean a wheel carrier that is suitable for mounting a tire rim. It could also be e.g. a wheel carrier for a chain wheel.

The sealing between a rotatable part on the output side of the planetary gear system and the gear casing preferably is positioned at a location further radially outside than a bearing of the wheel carrier; the sealing preferably does not project axially beyond this bearing. In this manner, there is virtually no space consumed in axial direction of the drive unit for sealing the rotatable part. The effect obtained in addition thereto is that the sealing and, if desired, the coupling site between the output side of the planetary gear system and the adjoining component in the torque path, is provided at a location that is subject to very little deformation under external forces. This results in enhanced functional safety and makes compensation elements, such as (elastic) couplings, superfluous.

Preferably, a part of the motor housing containing the outer peripheral wall and a radially outer portion of an end wall, is adapted to be detached from the drive unit, so that the stator is detached as well, and preferably a radially outer portion of the rotor is then adapted to be detached from the drive unit. This detachability of the stator preferably is present in the direction away from the planetary gear system; however, there are also designs possible in which the stator may be detached in the opposite axial direction.

Preferably, a portion of the rotor located on the other axial side of the rotor from the planetary gear system, is designed in the form of a drum of a drum brake.

The internal rotor of the electric motor provided according to the invention offers this possibility in particularly simple manner without requiring additional space. Braking on the rotor has the advantage that the brake moment is stepped up or increased by the planetary gear system so that the brake, for obtaining a desired brake moment, may be designed much smaller as if it were positioned on the output side of the planetary gear system. The drum brake mentioned preferably is an emergency brake and/or a parking brake of the motor vehicle; however, it is also possible to provide this brake in the form of a service brake. In addition thereto, it is possible to design the brake shoes of the drum brake as an emergency supporting means of the rotor. Due to the fact that the radial gap between the respective brake shoe and the inner circumference of the brake drum can easily be made smaller than the air gap of the electric motor, the construction may be such that the rotor, in case it is subject to mechanical excessive load, rather strikes a brake shoe than the stator.

Preferably, the outside of the wheel carrier is provided with a frictional service brake of the drive unit. The accommodation of the same on the wheel carrier outside provides for the advantage of easy accessibility for replacing the brake linings or brake pads.

The electric motor preferably is designed such that it can be utilized as service brake of the drive unit. In practical application, this preferably means that there is not only provided an electronics system for supplying current to the electric motor, but also an electronics system for withdrawing current from the "electric motor" which now operates in the generator mode. These two functions may be, but do not have to be, realized by a common electronics unit provided therefor, in the extreme case even by current controllers adapted to be used in dual manner. The current produced during braking either is fed back to a mains supply or is stored in a current accumulator or is converted into heat in brake resistors. It is possible to provide two alternative or mutually supplementing service brakes, one thereof operating as a frictional service brake and the other one thereof operating as an electric service brake.

It is to be stressed here that, when a motor vehicle has several drive units, there is preferably provided a power supply electronics system of its own for the electric motor of each drive unit.

The drive unit according to the invention permits a choice to be made between two design principles. It is either desired to accommodate a brake within the axial dimension of the tire rim. In that event, it is very advantageous that the drive unit proper (electric motor plus planetary gear system) is of very compact axial construction; i.e. in many cases may be provided axially beside the brake still-within the axial dimension of the tire rim. Or it is refrained from accommodating a frictional service brake axially beside the drive unit proper. The drive unit proper may then be built with relatively wide dimensions, in particular such that it takes at least 75%, still more preferably 80 to 100%, of the axial dimension of the tire rim. Such designs are particularly sensible when the electric motor is designed as a service brake. As an alternative or in addition thereto, it is possible to design the already mentioned drum brake formed integrally with the rotor as a service brake.

Preferably, the torque transmission connection between rotor and sun wheel or the torque transmission connection between planet carrier and wheel carrier is adapted to be separated, preferably from the outside without unmounting, in the extreme case even while the motor vehicle is in motion. A simple possibility (among quite a number of existing possibilities) of realizing this separability consists in the axial displaceability of a ring, shown, in detail in FIG. 1A, which has a multi-groove profile 106 on the circumference, at a location where torque is transmitted between an inner rotating part on the circumference, at a location where torque is transmitted between an inner rotating part 108 and a coaxial outer rotating part 104. The ring may be displaced along the axis X between a coupling position (shown) and an interrupting position (not shown).

In accordance with a particularly important preferred development of the invention, the electric motor is a reluctance motor, preferably a reluctance motor with electronically controlled current supply. As regards the pure design thereof, the rotors of reluctance motors have a series of marked poles distributed along the circumference. There are no wound coils or permanent magnets provided. In connection with the drive unit according to the invention, the reluctance motor or the rotor of a reluctance motor provides for the advantages that comparatively higher speeds and air gap diameters can be handled, that the mechanical stability poses no problem (no enveloping rotor bandage required!) and that overheating problems are less severe. In addition thereto, the simple manufacturing possibilities and thus the low price are pointed out. In the light of these advantages, there are tolerated certain weaknesses emanating from the principle, in particularly the, according to tendency, lower torque delivered as compared to some other types of electric motors. Finally, it is pointed out that, when the drive unit is provided with a reluctance motor, a towing operation of the drive unit concerned (e.g. as the motor vehicle as a whole is towed or since one or more other drive units continue to drive the vehicle and a defective electric motor of a specific drive unit is "dragged along") is possible without requiring a mechanical separation between the particular wheel and the particular rotor; in towing operation, there is no voltage induced in the coil-wound stator. This leads to the result that towing is possible with less power utilization and that— especially important (!)—towing is possible also without cooling of the electric motor.

Reluctance motors utilized with the invention as a rule have multi-phase windings. These are preferably provided along the circumference of the rotor with a non-uniform pole pitch.

The rotor of the reluctance motor preferably is provided with permanent magnets in addition so as to increase the power density of the reluctance motor at higher speeds. Preferably, this is not supposed to be so far-reaching that the mere reluctance motor (without permanent magnets) to a large part would already form an electric motor the rotor of which is provided with permanent magnets of alternating polarity. The merely supplementary, not very far-reaching formation with permanent magnets has the effect that large torques can still be generated also at higher speeds. This is also reflected in high braking moments when the electric motor is used as a brake.

Preferably, the stator is provided in the form of a sheet-metal stator and/or the rotor in the form of a sheet-metal rotor for reducing the eddy current losses.

In accordance with an especially important, preferred development of the invention, the stator is in the form of a water-cooled stator. A particularly preferred possibility consists in inserting axially extending, small stainless steel tubes of low wall thickness in axially extending grooves on the outer circumference of the stator, with cooling liquid flowing through these tubes. With this arrangement of cooling liquid tubes, the cooling liquid does not only take up heat from the stator iron, but also heat from the surrounding motor housing. When heat is transferred from the planetary gear system to the motor housing via the gear casing, the cooling liquid thus also takes up heat from the planetary gear system, In case of higher demands to be made with respect to cooling, it is possible to provide additional cooling channels in the stator. All cooling channels are connected to a system for circulating the cooling liquid by means of a pump. At a suitable location in the coolant circuit, e.g. on the outside of the motor housing or on the vehicle, there is provided a heat exchanger for finally discharging the heat to the surrounding air.

As already pointed out, it is preferred that the planetary gear system at least in part is cooled in that there is a thermally conductive connection to the motor housing and direct or indirect heat discharge is effected from there to the surroundings.

There is considerably less heat generated in the rotor than in the stator. Preferably, the rotor is air-cooled with air circulation, and the motor housing and/or the stator has a surface portion for taking up heat from the circulating air, so that the heat finally may be discharged further from there. This surface portion may be a portion of a particularly good thermally conducting metal and/or a portion having an increased surface area.

The bearings of the rotor and the planetary gear system and optionally the bearings of the wheel carrier preferably are lubricated with oil in common. In case of the drive unit according to the invention, this common lubrication can be realized in particularly good manner in terms of construction. The heat discharge from the lubricating oil preferably takes place via the gear casing and from there partly to the surroundings and partly to the motor housing.

Preferably, the drive unit has one or more connector elements for establishing an electrical connection and/or a cooling liquid connection to the motor vehicle.

The drive unit preferably comprises a tire pressure regulating system for selectively increasing or reducing the tire pressure. A pressurized-air line to the tire rim may be passed through a bore of the stub axle described hereinbefore, and a hydraulic line or an electric line may also be passed to the brake of the drive unit that is optionally provided on the side of the gear system directed away from the electric motor, It is emphasized that it is possible in the scope of the invention to realize the drive unit set forth in the initial paragraph without feature (g) mentioned there. In that case it may be advisable, but is not necessarily so, to provide one or more of the features disclosed in the present application in addition in order to define a novel and inventive drive unit.

An additional subject matter of the invention is a motor vehicle provided with at least one drive unit designed in accordance with the preceding statements.

Figure 1A:
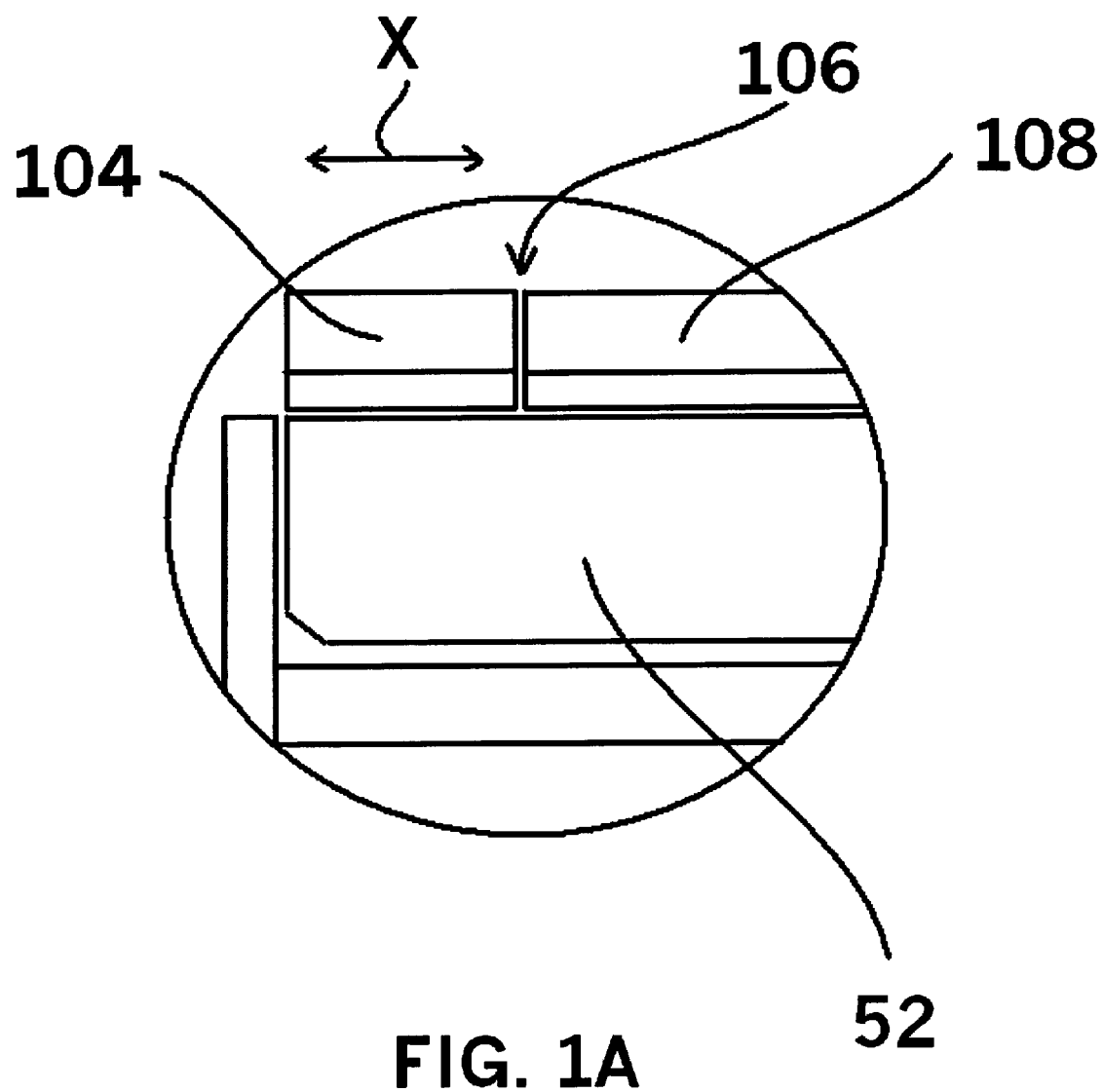

The invention and preferred developments of the invention will be described in more detail hereinafter by way of an embodiment illustrated in the drawings, wherein:

FIG. 1 shows a vertical axial sectional view of a drive unit, illustrating merely the upper half of the drive unit, with the lower half, which except for some details being a mirror-image of the former and having been omitted; and FIG. 1A shows an enlarged view of a portion of FIG. 1, showing a separable torque connection within the drive unit.

The drive unit 2 in its entirety is supported by a stub axle component 4 which in integral manner comprises the sturdy, cylindrical stub axle 6 proper as well as a base 8 having two bores 9. By means of the base 8, the entire drive unit 2 can be attached to a vehicle, not shown. By pivotal motion about the common axis of said bores 9, it is possible to steer the wheel of the vehicle provided with the drive unit 2.

Further to the right, the stub axle 6 supports a rotor 10 of an electric motor 12 by way of two rolling bearings 14. The rotor 10—roughly speaking—has the shape of a disc with a central opening. Around this central opening, the rotor 10 is axially enlarged to form a hub 16. The rotor 10 is axially enlarged in its radially outer portion 18 as well. The radially outer portion 18 is formed with rotor poles radially projecting towards the outside and being separated from each other by axially extending grooves and being connected to each other radially inside by a common back. The radially outer portion 18 is of sheet-metal design, i.e. it consists of a stacked number of metal sheets each arranged in radial plane transversely of the central axis 20 of the electric drive unit 2 and being electrically isolated from each other.

Rotor 10 is part of the reluctance electric motor 12. The electric motor 12 comprises a stator 12 radially outside from the rotor 10, which analogously to 355 the rotor 10 is of sheet-metal design. The stator 20 also has marked poles with grooves between the poles as well as a connecting stator back radially outside. The stator poles have coils wound thereon, with the so-called winding heads 22 being visible in the drawing that are formed in that the winding wires at the axial end located there leave a groove and in bent fashion are introduced into a different groove. The winding heads 22 at each axial end exceed the stator iron in axial direction by a dimension a. Between the inner circumference of the stator 20 and the outer circumference of the rotor 10, there is provided an air gap 24.

A motor housing 28 consists in essence of the following parts: the stub axle component 4 in the region between rotor 10 and bores 9 is designed in the form of a disc-like portion 26 of considerably increased diameter, which forms a large part of the end wall of the motor housing 28 located there. A second part of the motor housing 28 is formed by a dish-like component 30 having a large central opening. The centrally open bottom of component 30, in the assembled state, is closed by the disc-like portion 26; the remainder of the bottom constitutes an annular outer part of the end wall of the motor housing 28 located there. The circumferential wall of the dish-like component 30 constitutes the circumferential wall 32 of the motor housing 28.

On the left-hand side of the drawing, the completely open side of the dish-like component 30 is followed by a transmission or gear casing 34. The gear casing 34 consists substantially of three components: (1) a main part 36 extending radially inwardly from the connection to the dish-shaped component 30 of motor housing 28 and, in doing so, being cranked twice towards the right. (2) A cover-like component 38 on the right-hand side, which continues radially inwards up to a central opening of the gear casing 34. (3) A cover-like component 40 on the left-hand side, which on the left-hand side of a planetary gear system 42 extends radially inwardly up to a central opening.

The main constituent part 36 of gear casing 34, in the radially outer portion thereof, terminates the electric motor 12, to be precise the stator 20 of the same, towards the left-hand side. Radially inside from the winding head 22 on the left-hand side of the drawing figure, the main part 36 is bent towards the right and, shortly before the radial outer portion 18 of the rotor 10, it changes again to a radial path. Radially inside from the portion 18 of the rotor 10, the main part 36 is widened in axial direction towards the right. This portion is followed by the cover-like component 38 on the right-hand side, which constitutes the continuation of the gear casing on the right-hand side of the planetary gear system 42. The cover-like component 40 on the left-hand side closes off the planetary gear system 42 on the left-hand side thereof.

The main part 36 and the cover-like component 38 on the right-hand side thus are constituent parts of the gear casing 34 on the one hand, but on the other hand they also conclude the interior of the electric motor 12 on the left-hand side thereof.

Inside the planetary gear system 42 there is provided a planet carrier 44 supporting several axially extending bolts 46 distributed over the circumference thereof. Each bolt rotatably supports a stepped planet wheel 48. The partial region of each stepped planet wheel 48 of larger diameter is provided with a toothed portion 50 on its outer circumference. The toothed portion 50 is in mesh with a sun wheel 52 to be described in more detail further below. The portion of each stepped planet wheel 48 of smaller diameter, which is arranged axially on the right-hand side beside the larger-diameter portion, is provided with a toothed portion 54 on the outer circumference thereof. The toothed portion 54 meshes with an internally toothed, stationary ring gear 56 which is either formed integrally in the main part 36 of the gear casing 34 or is inserted therein as a separate part.

The afore-mentioned sun wheel 52 is a—roughly speaking—hollow cylindrical component, with the stub axle 6 penetrating the inside thereof. On a right-hand partial length, the sun wheel is introduced into a central bore of the hub portion 16 of the rotor and is connected to the rotor 10 there in non-rotatable manner. In a left-hand partial length, the sun wheel is provided with an externally toothed portion 52 and, as already mentioned, meshes with all circumferentially distributed stepped planet wheels 48.

The planetary gear system 42 is constituted by the afore-described parts sun wheel 52, stepped planet wheels 48, stationary ring gear 56, rotatable planet carrier 44. It can be seen that the teeth 50 of the planet wheels 48 meshing with the sun wheel 52 extend to a lesser extent towards the left-hand side in the drawing figure than the left-hand side winding heads 22 of the stator 20 of the electric motor 12. The teeth 50 are located axially beside the radially outer portion 18 which represents the portion of the rotor 10 adjoining the air gap 24. Those teeth 50 located at the very top in the drawing figure are spaced from the central axis 7 by a radial distance which is smaller than the radius of the air gap 24, but greater than the radius at the transition from the radially outer portion 18 of the rotor 10 to the disc-like portion of the rotor 10.

This situation may also be envisaged as a cylindrical enveloping surface which surrounds all maximum diameters of all planet wheels 40 on the outside, i.e. establishes contact with each individual toothed portion 50 of a particular planet wheel 48 for a short circumferential distance only. This enveloping surface may have ascribed thereto a diameter or radius and an axial width corresponding to the axial width of the toothed portion. This imaginary enveloping surface so to speak is arranged inside the angular space confined axially on the right-hand side by the radially outer portion 18 or the intermediary wall of the casing main part 36 and confined radially outside by the inner circumference of the entirety of the left-hand winding heads 22 or the intermediary wall of the casing main part 36 provided there. Without leaving the scope of the invention, the planetary gear system 42 may also be designed such that the planet wheels 48 extend a bit further towards the left-hand side, i.e. such that the toothed portions 50 have their left-hand side end portions project towards the left-hand side to a somewhat farther extent than the winding heads 22 on the left-hand side.

To the left from the planet wheels 48, the stub axle 6 has a wheel carrier 58 supported thereon, by means of two spaced apart rolling bearings 60. The wheel carrier 58 consists of a hub portion 62 and of a disc-like portion 64. The disc-like portion 64 has a brake drum 66 and a tire rim 68 attached thereto. A tire located on the rim 68 when the drive unit 2 is ready for operation is not illustrated.

On the right-hand side, the hub portion 62 of the wheel carrier 58 has a portion projecting beyond the disc-like portion 64 and having an axially extending multi-groove profile 70 provided on its outer circumference. The planet carrier 44 has a complementary multi-groove profile in its inner bore and by way of this profile is slid onto the multi-groove profile 70 of the wheel carrier 58. This provides for a torque-transmitting connection between planet carrier 44 and wheel carrier 58.

In the right-hand end portion of the hub portion 16 of rotor 10, there is positioned a sealing ring 72 sealing the interior of the motor housing 28 with respect to the bearings of rotor 10. In the left-hand end portion of the hub portion 16 of rotor 10, there is positioned a sealing ring 74 sealing the interior of the electric motor 12 with respect to the interior of the planetary gear system 42. The sealing ring 72 is located between the hub portion 16 of rotor 10 and the stub axle component 4. The sealing ring 74 is located between the hub portion 16 of the rotor 10 and the inner bore of the right-hand cover part 38. Between the inner bore of the left-hand cover part 40 and the outer circumference of an axial extension 76 of the planet carrier 44 projecting towards the left-hand side, there is provided a sealing ring 78 sealing the interior of the planetary gear system 42 with respect to the outer surroundings. Between the hub portion 58 and a component 80 non-rotatably mounted on the left-hand end portion of the stub axle 6, there is provided a sealing ring 82 sealing the supporting space of the wheel carrier 58 with respect to the outer surroundings. The sealing ring 78 cooperating with the planet carrier 44 is arranged in a location that is radially larger than the right-hand bearing of the wheel carrier 58, but neither extends beyond this bearing 60 axially on the left-hand side or axially on the right-hand side.

Furthermore, it can be seen that the inner periphery of the radially outer portion 18 of the rotor, at the location where this portion is located to the right of the disc-like portion of the rotor 10, is designed as a brake drum 84. Together with brake pads 86, there is formed an emergency and parking brake for the vehicle there. A cable or also a hydraulic line for operating the drum brake 84, 86 may expediently be passed through the disc-like enlarged portion 26 of the stub axle component 4.

The already mentioned component 80 is non-rotatably mounted on the left-hand end of stub axle 6. The component 80 has a brake carrier 88 mounted thereto. Attached to the brake carrier 88 are the non-rotary constituent parts of a service brake, not illustrated, of the drive unit 2. The brake shoes of this service brake act from inside against the inner periphery of the rotating brake drum 66. By detaching the brake carrier 88 towards the left, the service brake is accessible for brake lining replacement.

The dish-shaped component 30, upon release of connecting screws 102 to the disc-like enlarged portion 26 and release of connecting screws 102 to the main part 36 of the gear casing 34, may be removed from the drive unit 2 axially towards the right-hand side. In doing so, the stator 20 is detached as well. The disc-like portion 26 has an outer diameter that is sufficiently small to permit also a radially outer portion of the rotor 10 to be unmounted towards the right-hand side.

Radially outside on the stator 20, there is illustrated a small axially extending metal tube 90 in an exaggerated size. The tube 90 is arranged in an outer, axially extending groove on the outer circumference of the stator 20 and is in engagement with an axially extending groove of the circumferential portion 32 of the motor housing 28. Distributed over the circumference of the stator 20, there is positioned a multiplicity of such small tubes 90. They all have their left-hand ends connected to a coolant supply and their right-hand ends to a coolant discharge.

Means for circulating air within the motor housing 28 are not illustrated. Possible are e.g. extensions in the form of fan blades at a suitable location of the rotor 10.

On the right-hand end wall of the motor housing 28, there can be seen a connector element 92 through which electrical connections can be established, by way of one or more connectors, between the stator 20 and the body of the vehicle located to the right of the drawing figure, and through which coolant connections can be established between the stator 20 and the body of the vehicle. In addition thereto, a tire pressure regulating valve 94 is schematically illustrated in rim 68. A pressurized-air line 96 extends through a central bore of the stub axle component 4 and, as of a rotatable connection, then extends through a wheel-cap-like component 98 to the tire pressure regulating valve 94. The central bore of the stub axle component 4 also provides for the electric or hydraulic or pneumatic connection of the brake system to the brake carrier 88.

The embodiment has demonstrated that the invention permits an extremely expedient kind of support of rotor 10 and wheel carrier 58. The rotor 10 and the wheel carrier 58 are each supported on both sides of the plane in which the radial force is applied.

Suitable separating locations of torque transmission connections in the embodiment are the multi-groove connection between rotor 10 and sun wheel 52 as well as the multi-groove connection between planet carrier 44 and wheel carrier 58.

It is expressly pointed out that liquid cooling of the stator of an electric motor by means of small tubes, preferably of metal, located in the region of the stator back circumference remote from the air gap of the electric motor (as discussed in the embodiment in a preferred form) is also inventive as such, i.e. separately from the drive unit mentioned in the initial paragraph of the application and separately from the other features disclosed in the application. On the other hand, this liquid cooling preferably comprises one or more of the additional features disclosed in the application.

The invention claimed is:

1. An electric drive unit for a motor vehicle, comprising:
    (a) an electric motor having a motor housing fixed in non-rotatable manner;
    (b) a stator of said electric motor, with the stator being mounted in the motor housing and having coil-wound poles;
    (c) a rotor of the electric motor arranged internally of the stator, with an air gap being present between the pole faces of the stator and the outer periphery of the rotor facing said pole faces of the stator;
    (d) a planetary gear system having a sun wheel, a planet carrier, planet wheels and a ring gear,
    (e) the rotor of the electric motor and the sun wheel of the planetary gear system being coupled for torque transmission;

(f) a gear casing of the planetary gear system, the gear casing being attached to the motor housing or at least in part being an integral component part of the motor housing;
wherein:
(g) the planet wheels of the planetary gear system are stepped planet wheels comprising a first toothed portion of larger diameter and a second toothed portion of smaller diameter, the first toothed portions of the stepped planet wheels engaging the sun wheel and the second toothed portions of the stepped planet wheels engaging the ring gear;
(h) an imaginary common envelope cylinder for all outer diameters of the first toothed portions of the stepped planet wheels is located radially inside of winding heads present on one axial side of the stator as well as axially beside the portion of the rotor adjoining the air gap, and the first toothed portions of the stepped planet wheels project in axial direction outwardly beyond said winding heads either not at all or with less than 50% of their tooth width in engagement with the sun wheel; and
(i) the second toothed portions of the stepped planet wheels have their outer diameters project into a space of the rotor which is axially recessed from the face side of the rotor present at the portion of the rotor adjoining the air gap.

2. A drive unit according to claim 1, characterized in that the ring gear of the planetary gear system is non-rotatable and the rotatable planet carrier is provided for transmission output.

3. A drive unit according to claim 1, characterized in that there is provided a stub axle on which the motor housing is mounted and/or with which the motor housing—at least in part—forms an integral component; and that the rotor is supported on the stub axle.

4. A drive unit according to claim 3, characterized in that the sun wheel is an externally toothed hollow wheel having the stub axle extending therethrough.

5. A drive unit according to claim 3, characterized in that a wheel carrier is rotatably supported on the stub axle in a position axially beside the electric motor and the planetary gear system.

6. A drive unit according to claim 5, characterized in that the wheel carrier has a tire rim mounted thereon.

7. A drive unit according to claim 5, characterized in that a seal between a rotatable part on the output side of the planetary gear system and the gear casing is positioned at a location radially further outside than a bearing of the wheel carrier.

8. A drive unit according to claim 1, characterized in that a part of the motor housing contains an outer peripheral wall and a radially outer portion of an end wall, is adapted to be detached from the drive unit, so that the stator is detached as well.

9. A drive unit according to claim 1, characterized in that a portion of the rotor located on the other axial side of the rotor from the planetary gear system, is designed in the form of a drum of a drum brake.

10. A drive unit according to claim 9, characterized in that the brake shoes of the drum brake are designed as an emergency supporting means of the rotor.

11. A drive unit according to claim 5, characterized in that a frictional service brake of the drive unit is provided on the outside of the wheel carrier.

12. A drive unit according to claim 1, characterized in that the electric motor is designed such that it can be utilized as service brake of the drive unit.

13. A drive unit according to claim 5, characterized in that the axial dimension of the unit of electric motor and planetary gear system is at least 75% of the axial dimension of the tire rim.

14. A drive unit according to claim 1, characterized in that the torque transmission connection between the rotor and the sun wheel or the torque transmission connection between the planet carrier and a wheel carrier is adapted to be separated.

15. A drive unit according to claim 1, characterized in that the electric motor is a reluctance motor.

16. A drive unit according to claim 15, characterized in that the rotor of the reluctance motor is provided in addition with permanent magnets so as to increase the power density of the reluctance motor at higher speeds.

17. A drive unit according to any of claims 1, characterized in that the stator is water-cooled.

18. A drive unit according to claim 1, characterized in that the planetary gear system at least in part is cooled in that there is a thermally conductive connection to the motor housing and direct or indirect heat discharge is effected from there to the surroundings.

19. A drive unit according to claim 1, characterized in that the rotor is air-cooled with air circulation, and in that the motor housing and/or the stator has a surface portion for taking up heat from the circulating air.

20. A drive unit according to claim 1, further comprising bearings supporting the rotor and the planetary gear system, and optionally bearings supporting a wheel carrier, wherein at least some of the bearings are lubricated with oil in common.

21. A drive unit according to claim 1, characterized by a connector element for establishing an electrical connection and/or a cooling liquid connection to the motor vehicle.

22. A motor vehicle, characterized in that it is provided with a drive unit designed in accordance with claim 1.

23. The drive unit according to claim 7, wherein the seal does not project axially beyond the bearing.

24. A drive unit according to claim 5, characterized in that the axial dimension of the unit of electric motor and planetary gear system is about 80 to 100% of the axial dimension of the tire rim.

25. A drive unit according to claim 15, wherein the reluctance motor includes an electronically controlled current supply.

* * * * *